Patented Nov. 15, 1927.

1,649,144

UNITED STATES PATENT OFFICE.

THEODORE B. WAGNER, OF BROOKLYN, NEW YORK, AND CHARLES A. GLABAU, OF HASBROUCK HEIGHTS, NEW JERSEY.

ART OF PRODUCING LEAVENED-DOUGH PRODUCTS.

No Drawing. Application filed June 21, 1924, Serial No. 721,582. Renewed April 5, 1927.

Our invention relates to an improvement in the art of producing leavened bread and other yeast dough products, the main object of our improvement being to reduce to a marked degree the time necessary for leavening.

A substantial reduction in the amount of time necessary for fermenting leavened dough is of great practical and commercial importance. The shorter the time necessary for fermentation the greater is the amout of fermented dough which can be prepared in a given period of time in a plant of a given size, or conversely, the smaller is the amount of apparatus necessary for the daily production of a given quantity of fermented dough. Furthermore, there is a saving in labor and fuel, and a lessening of opportunties for bacterial infection of the dough by exposure to air.

In order that our invention, and the advantages flowing therefrom, may be more clearly understood, we refer to the standard commercial method of baking bread and to a method which has been introduced recently on a commercial scale and known as the "no-time-dough" method:

Standard method.

Typical formula:

| | Pounds. |
|---|---|
| Flour | 100 |
| Water | 60 |
| Salt | 1¾ |
| Yeast | 1¾ |
| Sugar | 2 |
| Malt extract | 1 to 1½ |
| Milk solids | 3 |
| Shortening | 2 |

Dissolve the yeast in about 1 gallon of water. Place the balance of the water into the mixer, add the salt, sugar, malt and dry milk, then stir to dissolve the materials. After a solution is obtained, add the flour, begin mixing and then add the yeast. After these materials have become commingled, add the shortening and continue mixing until the dough is smooth. Place the dough into a large trough and allow it to ferment, the temperature being kept at about 78-80° F.

Fermentation period:

| | Hours. |
|---|---|
| 1st rising | 2¼ |
| 2nd rising | 1 |
| 3rd rising | ½ |
| 4th rising | ¼ |

Punch the dough after each rising to permit escape of the carbonic acid gas.

Make-up stage: The dough is now divided, rounded, allowed to rest 10–15 minutes, molded into the required shape and put into pans.

Proofing stage: The pans are placed in the "proofing chamber" and allowed to rest for from 45–50 minutes.

Baking stage: The pans are placed in the baking oven and the dough is baked at from 450–500° F.

Sweetened condensed milk is frequently used and in such case about 8 pounds of sweetened condensed milk are substituted for the milk solids and the sugar of the above formula.

It should, of course, be understood that the actual fermentation begins during the mixing stage and continues until after the initial baking stage is reached. In the baking art, however, the term "fermentation period" is applied to indicate the time during which the mixed dough remains in the dough troughs and before it is cut up into loaves. These dough troughs are placed in a special room known as the dough room which is maintained at the temperature indicated.

No-time-dough method.

This method eliminates the "fermentation period" altogether and with it the necessity for a fermenting room and dough troughs. It is carried out by increasing the amount of yeast over that generally employed and by raising the temperature of the dough as coming from the mixer to 90° F., or somewhat higher, and raising the temperature of the proofing chamber to approximately 110° F., the main fermentation thus taking place in the dough after it has been cut up into loaves and placed into the loaf pans. This method, however, has not been adopted generally by commercial bakers mainly because it results in a decided alteration of the character of the bread.

The improved method.

During the leavening period (fermentation period, make-up stage and proofing stage) the ingredients of the dough undergo chemical and other changes. The most important of these are the growth of the yeast, with resulting formation of lactic acid and carbon dioxid, and the "maturing" of the gluten of the flour by the acid; the carbon dioxid performs the function of raising the dough.

We have found that, without altering unfavorably the character of the bread, we can eliminate the so-called "fermentation period" by adding to the dough a suitable proportion of a yeast activator and also a suitable proportion of a gluten maturing agent, which while not impeding the propagation of the yeast, is capable of so acting upon the gluten of the flour as to cause it to "mature".

Yeast activator.

By "yeast activator" we mean a substance which, when added to yeast, will exert a favorable action upon its propagation and bring about an intensification of its functions. Examples: ammonium phosphate, ammonium sulphate, ammonium chloride, acid ammonium phosphate, also such oxidizing agents as bromate of potash, persulphate and perchlorate of potash.

By suitable proportion of a yeast activator we mean such a proportion as will cause the usual yeast content of the dough to yield, during the time allowed for the make-up and proofing stages, the necessary amount of carbon dioxide required for the proper leavening of the dough.

The term "yeast activator" is intended by us to include all such materials known to those skilled in the art as yeast foods and yeast stimulants, as no sharp line of division can be drawn and these designations are generally used interchangeably.

We prefer, however, to use as an activator a suitable substance, having a large content of phosphorus and calcium in organic combination, for instance a substance containing about 35% of phosphorus, calculated as phosphoric pentoxide and about 22% of calcium, calculated as calcium oxide, both in organic combination.

Our preferred yeast activator which we call in our claims "organic yeast activator", is made from Indian corn in substantially the following manner:

In the manufacture of starch and commercial glucose, the corn is immersed, at an elevated temperature, in water usually acidulated with sulfur dioxid, for a longer or shorter period of time, usually forty-eight hours, whereupon the liquid is withdrawn from the corn and, after concentration, mixed with other by-products of corn and utilized therewith as a cattle food.

This immersion in water serves to leach from the corn practically all of its extractive matter and the watery extract thus obtained is known to those skilled in the art as "light steepwater" and after concentration as "heavy steepwater". The solids contained therein are commonly designated as "corn solubles" of which the more important are present approximately in the following amounts:

| | Per cent (dry basis). |
|---|---|
| Organic phosphorus as $P_2O_5$ | 8.0 |
| Organic potash as $K_2O$ | 6. |
| Organic calcium as $CaO$ | 1.5 |
| Nitrogenous substances (N x 6.25) | 44.0 |
| Organic acids, as lactic | 16.0 |

We use the light or the heavy steepwater as our raw material, whichever is more readily available, add milk of lime in sufficient quantity to reduce the acidity to zero or nearly so, heat the mixture and collect, wash and dry the resultant precipitate. The following is a practical illustration of the procedure:

To obtain about 1000 lbs. of the activator, we take about 2200 gallons of heavy steepwater usually having a density corresponding to 24° Baumé, reduce it to 18° Baumé by the addition of water, and then add sufficient lime to render the solution neutral, or nearly so. Before adding the lime to the steepwater, we work it into a milk by adding water, usually in the ratio of 50 lbs. of lime to 50 gallons of water. We use about 450 lbs. of lime in the treatment of the above mentioned 2200 gallons of concentrated steepwater. We add the milk of lime gradually and under vigorous agitation of the mixture and exercise particular care in adding the milk of lime the more slowly the more the neutral point is approached, testing the batch frequently with litmus paper.

After sufficient milk of lime has been added to render the mixture neutral or leave it faintly acid, we heat it to 180° F. under constant agitation and then proceed to collect the precipitate, preferably in a filter-press, wash it thoroughly with water either in the press or after dropping it into a vat and finally dry it in a suitable apparatus until the moisture content has been reduced approximately to 10%.

In order to secure homogeneity, we prefer to reduce the product to a fine powder by grinding or pulverizing.

The activator is characterized by its large content of phosphorus and calcium in organic combination, as evidenced by the following analytical data, to wit:

| | Per cent. |
|---|---|
| Phosphorus as $P_2O_5$ | 33–35 |
| Calcium as CaO | 20–22 |

If the product has been thoroughly washed it is practically odorless and tasteless.

This activator, and the process of making it, are not our invention but are the invention of one of us, Theodore B. Wagner. However, the results obtained by the use thereof are so superior to the results obtained by the use of other activators, that we have deemed it not only advisable but necessary to describe fully its nature and manufacture. While we do not know the exact nature of the biochemical process involved, we believe that the yeast, being a living organism, is subject to a calcium metabolism not dissimilar to that forming a part of the human metabolic process. The organic character of our activator seems to aid materially the metabolism of the calcium and to further its assimilation by the yeast. In place of the particular organic calcium-phosphorus compound described, we may use, but not with quite as favorable results, the product described in United States Letters Patent No. 914,379, issued March 9, 1909, to Arno Behr.

Gluten maturing agent.

The gluten maturing agent should be one that, in the quantity used, is innocuous, and is not detrimental to the propagating and functioning of the yeast. The best agents known to us are lactic, malic, mucic, phosphoric and hydrochloric acids, and the acid salts of some of them. Hydrochloric acid is frequently particularly indicated because of its high ionizing property in the quantity of liquid used in the making up of the dough. For ths reason the quantity required is small, which makes it possible to spray it directly into the mixture of our yeast activator and its diluent, as hereafter referred to.

We give dry acids, such as malic and mucic, the preference, when it is desired to make a prepared flour or a compound, containing both the yeast activator and the gluten maturing agent. Again, we prefer to use in such preparations mucic acid, as it has a nearly neutral taste.

As regards the quantity of the maturing agent which should be used, care must be had, of course, that neither too much nor too little is used, as in one case an overdeveloped dough would result and in the other the leavening period would not be shortened to a commercially valuable degree.

The quantity which should be used for optimum results is such, theoretically at least, as will, with the aid of the lactic acid formed by the yeast, adequately mature but not overmature the gluten present in the flour during the make-up and proofing stages. However, we practically disregard the lactic acid produced by the yeast, especially since it is formed comparatively slowly, and add so much of the maturing agent as will adequately mature the gluten present during the time indicated.

However, in ascertaining the proportion of the gluten maturing agent to be used, the determination should not be based upon the theory, accepted by some, that the maturing agent acts only upon the glutenin content of the gluten to convert it into gliadin, the remaining gliadin in the gluten remaining unaffected. Much more of the agent should be used than would be necessary under this theory. The determination should be based upon the theory which we believe to be correct, but to which we do not, as yet, desire to stand committed, that the maturing agent hydrates substantially all the gluten present.

The most practical method of determining just how much of the maturing agent should be used is by the cut and try method—care being taken not to use so much of the agent as to cause a collapse of the dough; if the dough made of flour of a particular composition and with a given proportion of yeast matures within the time indicated, the proportion of the agent used should be made standard for other flours of the same composition when used with the same proportion of yeast. We have indicated what we believe to be the wrong and the right theories of gluten maturing in order to warn against using too little of the maturing agent.

As glutens differ from one another somewhat, depending upon the character of the flour, and as acids and acid salts differ somewhat in their ionizing properties, it is not feasible to lay down a general practical formula for determining in what proportion any particular maturing agent is to be added. The formula in any particular case can, however, readily be determined by dividing a sample of the particular gluten into batches of equal weight, suspending each batch in a different solution of the maturing agent to be used, for about one hour, and then weighing each batch, each solution differing in concentration from that of the other. If the gluten has, in any case, become flocculent this must be taken as indicating overmaturing. The solution which has given the highest increase in weight to its particular batch is to be taken as representing the best strength of solution for use, other things being equal, although it is advised that a solution of slightly less concentration be used in order to make sure that in practical operation overmaturing does not result thus making a slight allowance for the increase in acidity caused by the acid which is constantly being produced, even through in small quantities, by the yeast. For instance, ten samples of a particular gluten, each weighing one gram are suspended for one hour, each in one of a series of solutions of lactic acid, varying progressively from one-tenth to one per cent. If at the end of this period the greatest amount of weight has been gained by the sample suspended in, say, the .4 solution, then a solution of .35 is to be taken as standard for practical operation with this particular grade of gluten and this particular maturing agent.

The chemist will understand us when we say that as a practical rule the dough shall be considered matured when an hydrogen ion concentration is reached lying between 5 and 4.8 pH.

We desire it to be understood also that gluten maturing agents other than those specifically referred to may be used, for instance acid bearing bodies, such as malt extracts, malt syrups or butter milk when they contain a fairly large percentage of a suitable organic acid, such as lactic acid.

When in our claims we refer to a quantity of gluten-maturing agent sufficient to effect the maturing of the gluten, we desire it to be understood that we do not intend to claim a quantity so high as to break down or overmature the gluten but that, on the other hand, we desire it to be understood that the use of a lesser amount of such agent would result merely in a proportionate lengthening of the leavening period and would therefore be within the spirit of such claims unless so little of the agent were used as not substantially to shorten the leavening period. In any event we desire it to be understood, as we have hereinbefore indicated when giving the test for determining the proper quantity of gluten maturing agent by finding the optimum strength of solution, that when we refer in our claims to a quantity of gluten maturing agent sufficient to effect the maturing of the gluten, this means that with the amount of water necessary for making the dough batch the desired strength of solution is obtained to effect the maturing of the gluten within the desired briefer period of time.

The proportion of yeast which we prefer to use for any particular dough product is that which is generally employed in the baking of such products for instance, in the case of bread, about 1½ to 1¾ pounds for every hundred pounds of flour used. As the maturing of the gluten, when aiding by the addition of a suitable proportion of a maturing agent, will consume considerably less time than the development of lactic acid by the above named proportion of yeast, even when the growth of the latter is aided by the addition of an activator, we may still further shorten the leavening period by adding a larger proportion of yeast. However as with the quantity indicated, the leavening period would be shortened to about one hour, it would not, under ordinary circumstances, be worth while to shorten it still further. Of course, enough yeast has to be used, in any event, to provide, within the period allowed, under the circumstances, the necessary amount of carbon dioxide.

The gluten maturing agent and the yeast activator may be mixed and sold as a composition of matter to the baker for use in making leavened bread.

If both the gluten maturing agent and the yeast activator are dry materials, they may be mixed with flour or other diluents and used by the baker, it being necessary to add only yeast, flour and the other usual ingredients to have a dough whose "fermentation period" as above defined, may be eliminated entirely; care being taken, of course, to keep the ingredients of the mixture dry so that the maturing agent will not prematurely effect the gluten of the flour used as the diluent.

We may mix the dry gluten maturing agent and the dry organic yeast activator with such a quantity of baking flour, that the mixture may be used by the commercial as well as the home baker as a regular dough flour, in place of ordinary flour and such mixture would constitute a "prepared" flour.

Again, the yeast activator may be mixed with a proper proportion of flour, and the mixture sold to and used by the housewife or baker, who may then add the necessary proportion of gluten maturing agent, for instance lactic acid, as such, or in the form of buttermilk. We abstain, however, from citing further methods of applying our invention to practice as their number is almost unlimited, for the reason that in view of the large number of ingredients entering into the making up of a dough batch, variations and combinations may be devised which are limited only in proportion to their mathematical possibilities.

In addition to the elimination of the fermentation period, our invention effects a saving in dough materials by avoiding the losses incidental to evaporation and decomposition as brought on by the action of the yeast during the fermentation period, and it causes also an increased yield of dough due, we believe, to increased hydration; our invention reduces the danger of bacterial infection during the fermentation period, and, in general, simplifies and tends to standardize the production of leavened bread; it also reduces production cost in point of labor and fuel and effects a reduction of investment in plant and equipment by eliminating the troughs and the space required therefor.

The following examples illustrate our invention:

Example 1.

Formula:

| | Pounds. |
|---|---|
| Flour | 400 |
| Water | 250 |
| Milk solids | 11.5 |
| Salt | 7 |
| Sugar | 5 |
| Malt | 5 |
| Shortening | 8 |
| Yeast | 7 |
| Lactic acid (50%) | 3 |

With the above is used one pound of the "organic yeast activator" hereinbefore particularly described. Put the yeast and the activator into about one gallon of water in the mixture and stir to dissolve the yeast. Put the balance of the water into the mixer, add the salt, sugar, malt extract and milk, and stir until these materials have become thoroughly commingled. Then stir in the lactic acid solution, add the flour and start the mixing. After these materials have been thoroughly mixed, add the shortening and continue the mixing until the dough is smooth. The temperature of the dough should be kept at 78–80° F.

If desired, sweetened condensed milk may be substituted for the dry milk and the sugar, as stated in connection with the explanation of the standard formula.

Pass the dough through the divider, round it, allow it to rest for fifteen minutes, mold it into the required shape, place it into the pans, allow it to rest 45–50 minutes at the temperature usually employed in the proofing chamber, that is to say about 90° F. and bake at the temperature usually employed, to wit: 450–500° F. The result is a bread excelling in flavor and volume. It will be noted by comparing the above example with the standard method hereinbefore given, that the leavening period has been reduced by four hours, that is to say, the so-called "fermentation period" has been eliminated entirely.

Example 1$^b$.

Same as Example 1, using .5 pounds of ammonium sulfate as the activator. The result is the same as in Example 1 except that the grain of the finished bread is not as excellent.

Example 1$^c$.

Same as Example 1, using .5 pounds of ammonium acid phosphate as the activator. The result is the same as in Example 1 and, while extremely good, is not as excellent with respect to grain and volume as in Example 1.

Example 1$^d$.

Same as Example 1, using 1 pound of ammonium chlorid as the activator. The results are the same as with Examples 1 and 1$^b$ except that the volume is less and the grain not quite as good.

Example 2.

Mix substantially equal parts of malic acid (dry) and the organic yeast activator hereinabove specifically described. This mixture may be used by the baker at the rate of one pound to the barrel of flour.

Example 2$^b$.

Mix 38 parts of mucic acid with 25 parts of the organic yeast activator and use at the rate of one pound to the barrel of flour.

Example 3.

Mix 28 parts of malic acid and 25 parts of the organic yeast activator with 47 parts of flour, or other suitable diluent or carrier, for use by the baker at the rate of one pound to one hundred pounds of dough flour.

Example 3$^b$.

Mix 25 parts of the organic yeast activator with 73.4 parts of flour, or other diluent, with which have previously been incorporated 1.6 parts of pure hydrochloric acid (spec. grav. 1.2) suitably diluted with water. It may become necessary in this case to dry the mixture, so as to reduce its moisture content to approximately 10%. This mixture may be used by the baker at the rate of one pound to one hundred pounds of dough flour.

Example 4.

Mix 28 parts of malic acid and 25 parts of the organic yeast activator with 9947 parts of flour and use in the making up of the dough batch without the further addition of flour.

We claim:

1. The method of making leavened bread which comprises bringing into admixture with flour, yeast and other ingredients of the dough batch a yeast activator and a gluten maturing agent, the latter sufficient in quantity to effect the maturing of the gluten of the flour, and fermenting the batch substantially as and for the purpose described.

2. The method of making leavened bread which comprises bringing into admixture with flour, yeast and other ingredients of the dough batch, a gluten maturing agent in quantity sufficient to effect the maturing of the gluten and a yeast activator containing phosphorus and calcium in organic combination substantially as and for the purpose described.

3. The method of making leavened bread which comprises bringing into admixture with flour, yeast and other ingredients of the dough batch, a gluten maturing agent in quantity sufficient to effect the maturing of the gluten and the specified organic yeast activator derived from and containing the soluble phosphorus and calcium ingredients of corn steepwater. substantially as and for the purpose described.

4. The method of making leavened bread which comprises bringing into admixture with flour, yeast and other ingredients of the dough batch, hydrochloric acid in quantity sufficient to effect the maturing of the gluten of the flour and a yeast activator, and fermenting the batch, substantially as and for the purpose described.

5. The method of making leavened bread which comprises bringing into admixture with flour, yeast and other ingredients of the dough batch, hydrochloric acid in quantity sufficient to effect the maturing of the gluten of the flour and a compound containing phosphorus and calcium in organic combination, substantially as and for the purpose described.

6. The method of making leavened bread which comprises bringing into admixture with flour, yeast and other ingredients of the dough batch, hydrochloric acid in quantity sufficient to effect the maturing of the gluten of the flour and the specified organic yeast activator derived from and containing the soluble phosphorus and calcium ingredients of corn steepwater, substantially as and for the purpose described.

7. As a composition of matter for use associated with yeast in the making of leavened bread, flour in admixture with a yeast activator and with a gluten maturing agent sufficient in quantity to effect the maturing of all the gluten of the flour when such agent is dissolved in the amount of water necessary for making a dough batch with said flour.

8. As a composition of matter for use associated with yeast in the making of leavened bread, flour in admixture with the described organic yeast activator and with a gluten maturing agent sufficient in quantity to effect the maturing of all the gluten of the flour when such agent is dissolved in the amount of water necessary for making a dough batch with said flour.

9. As a composition of matter for use associated with yeast in the making of leavened bread, flour in admixture with the described organic yeast activator and with hydrochloric acid sufficient in quantity to effect the maturing of all the gluten of the flour when such agent is dissolved in the amount of water necessary for making a dough batch with said flour.

THEODORE B. WAGNER.
CHARLES A. GLABAU.